United States Patent
Lee et al.

(10) Patent No.: US 11,265,232 B2
(45) Date of Patent: Mar. 1, 2022

(54) IOT STREAM DATA QUALITY MEASUREMENT INDICATOR AND PROFILING METHOD AND SYSTEM THEREFOR

(71) Applicant: GTONE CO., LTD., Seoul (KR)

(72) Inventors: Dongwoo Lee, Gyeonggi-do (KR); Sangyub Lee, Seoul (KR)

(73) Assignee: GTONE CO., LTD, Seoul (KR)

( * ) Notice: Subject to any disclaimer, the term of this patent is extended or adjusted under 35 U.S.C. 154(b) by 22 days.

(21) Appl. No.: 16/864,280

(22) Filed: May 1, 2020

(65) Prior Publication Data
US 2021/0058307 A1 Feb. 25, 2021

(30) Foreign Application Priority Data
Aug. 21, 2019 (KR) .................. 10-2019-0102059

(51) Int. Cl.
| | |
|---|---|
| H04L 12/26 | (2006.01) |
| G16Y 40/10 | (2020.01) |
| H04L 43/04 | (2022.01) |
| H04L 67/12 | (2022.01) |
| G06N 20/00 | (2019.01) |
| H04L 43/065 | (2022.01) |

(52) U.S. Cl.
CPC .............. *H04L 43/04* (2013.01); *H04L 67/12* (2013.01); *G06N 20/00* (2019.01); *G16Y 40/10* (2020.01); *H04L 43/065* (2013.01)

(58) Field of Classification Search
CPC ....... H04L 43/04; H04L 43/06; H04L 43/065; H04L 43/08; H04L 67/12; H04L 67/30; H04L 67/327; G16Y 40/10
See application file for complete search history.

(56) References Cited

U.S. PATENT DOCUMENTS

2018/0211168 A1* 7/2018 Khurshudov .......... G06N 5/025

FOREIGN PATENT DOCUMENTS

| KR | 101746646 B1 | 6/2017 |
| KR | 1020170141928 A | 12/2017 |

OTHER PUBLICATIONS

Chung et al. "Design of Software Quality Evaluation Model for IoT" Journal of the Korea Institute of Information and Communication Engineering, vol. 20, No. 7, 1342-1354, Jul. 2016 and its English abstract.

* cited by examiner

*Primary Examiner* — Jason D Recek
(74) *Attorney, Agent, or Firm* — McCormick, Paulding & Huber PLLC

(57) ABSTRACT

An internet of things (IoT) stream data quality indicator and profiling method and a system therefor are provided. The method for measuring IoT stream data quality includes receiving stream data generated from at least one or more IoT equipment sensors, calculating quality indicators being preset for the received stream data, and measuring quality for the stream data of the IoT equipment sensor based on the calculated quality indicators. The quality indicators include a single signal quality indicator (SSQI) which is a quality indicator for single stream data and a multiple signals quality indicator (MSQI) which is a quality indicator for a relationship between several stream datasets.

12 Claims, 8 Drawing Sheets

IOT STREAM DATA QUALITY MEASUREMENT INDICATOR AND PROFILING METHOD AND SYSTEM THEREFOR

CROSS-REFERENCE TO RELATED APPLICATIONS

A claim for priority under 35 U.S.C. § 119 is made to Korean Patent Application No. 10-2019-0102059 filed on Aug. 21, 2019, in the Korean Intellectual Property Office, the entire contents of which are hereby incorporated by reference.

BACKGROUND

Embodiments of the inventive concept described herein relate to quality measurement indicators of Internet of things (IoT) stream data and profiling technologies, and more particularly, relate to a method for defining quality indicators for measuring IoT stream data quality and measuring the IoT stream data quality in real time using the defined quality indicators and a system therefor.

With the entrance into the fourth industrial revolution, existing works managed by people have been replaced by machine. To this end, the Internet of things (IoT), that is, there has been a need for an environment where machine and machine are connected to each other over a network and transmits and receives data, and it has already been entrenched in various fields. Sensors of equipment generate data in real time, and systems which monitor and control them are used in each industry field. An IoT monitoring system checks defects for a data value of a single sensor connected thereto and are composed of functions for determining a current situation based on it. It is an important work to diagnose equipment, networks, or the like in real time and determine and improve problems and it is work to need a wealth of experience and knowledge for domains.

The current IoT industry has introduced the above system and has reached the level of diagnosing data as well as generating and collecting data. Industrial maturity is gradually increased, and companies integrate and analyze data to use IoT data. The quality of data for a data integration and analysis work should be viewed from the viewpoint different from an existing single system or existing quality of data. Particularly, methods for measuring quality for data, including time information which is characteristics of IoT data, which is endlessly generated and flowing should be discussed, and criteria for the data should be established.

Thus, there is a need for a method capable of defining quality indicators for measuring IoT stream data quality and measuring the IoT stream data quality in real time using the defined quality indicators.

SUMMARY

Embodiments of the inventive concept provide a method for defining quality indicators for measuring IoT stream data quality and measuring the IoT stream data quality in real time using the defined quality indicators and a system therefor.

According to an exemplary embodiment, a method for measuring IoT stream data quality may include receiving stream data generated from at least one or more IoT equipment sensors, calculating quality indicators being preset for the received stream data, and measuring quality for the stream data of the IoT equipment sensor based on the calculated quality indicators.

The quality indicators may include a single signal quality indicator (SSQI) being a quality indicator for single stream data and a multiple signals quality indicator (MSQI) being a quality indicator for a relationship between several stream datasets.

The SSQI may include a uniform frequency indicator, an empty time indicator, a flat value indicator, a value period indicator, an event pattern indicator, an enough volume indicator, an out of range outlier indicator, a statistical outlier indicator, a data update indicator, a trend abnormal indicator, and a wrong timestamp indicator. The MSQI may include an interactive rule indicator, a value similarity indicator, a distribution similarity indicator, a pattern similarity indicator, a trend similarity indicator, and a time synchronicity indicator.

The measuring of the quality may include measuring the quality for the steam data of the IoT equipment sensor by integrating each of the calculated quality indicators.

The measuring of the quality may include measuring the quality for the steam data of the IoT equipment sensor by multiplying each of the calculated quality indicators by a weight being preset for each of the quality indicators and integrating the quality indicators by which the weight is multiplied.

The measuring of the quality may include measuring the quality for the steam data of the IoT equipment sensor by dividing the calculated quality indicators into groups for every data quality characteristics, calculating each score for each data quality characteristic group, and integrating each calculated score for each data quality characteristic group.

The measuring of the quality may include measuring the quality for the steam data of the IoT equipment sensor by multiplying each of quality indicators included for each data quality characteristic group by a predetermined primary weight, calculating each score for each data quality characteristic group using the quality indicators by which the primary weight is multiplied, and integrating each calculated score for each data quality characteristic group.

The measuring of the quality may include measuring the quality for the steam data of the IoT equipment sensor by calculating each score for each data quality characteristic group using the quality indicators by which the primary weight is multiplied and multiplying and integrating each calculated score for each data quality characteristic group by a secondary weight being preset for each data quality characteristic group.

According to an exemplary embodiment, a system for measuring IoT stream data quality may include a reception unit that receives stream data generated from at least one or more IoT equipment sensors, a calculation unit that calculates quality indicators being preset for the received stream data, and a measurement unit that measures quality for the stream data of the IoT equipment sensor based on the calculated quality indicators.

The quality indicators may include a single signal quality indicator (SSQI) being a quality indicator for single stream data and a multiple signals quality indicator (MSQI) being a quality indicator for a relationship between several stream datasets.

The SSQI may include a uniform frequency indicator, an empty time indicator, a flat value indicator, a value period indicator, an event pattern indicator, an enough volume indicator, an out of range outlier indicator, a statistical outlier indicator, a data update indicator, a trend abnormal indicator, and a wrong timestamp indicator. The MSQI may include an interactive rule indicator, a value similarity indicator, a distribution similarity indicator, a pattern similarity indicator, a trend similarity indicator, and a time synchronicity indicator.

The measurement unit may measure the quality for the steam data of the IoT equipment sensor by integrating each of the calculated quality indicators.

The measurement unit may measure the quality for the steam data of the IoT equipment sensor by multiplying each of the calculated quality indicators by a weight being preset for each of the quality indicators and integrating the quality indicators by which the weight is multiplied.

The measurement unit may measure the quality for the steam data of the IoT equipment sensor by dividing the calculated quality indicators into groups for every data quality characteristics, calculating each score for each data quality characteristic group, and integrating each calculated score for each data quality characteristic group.

The measurement unit may measure the quality for the steam data of the IoT equipment sensor by multiplying each of quality indicators included for each data quality characteristic group by a predetermined primary weight, calculating each score for each data quality characteristic group using the quality indicators by which the primary weight is multiplied, and integrating each calculated score for each data quality characteristic group.

The measurement unit may measure the quality for the steam data of the IoT equipment sensor by calculating each score for each data quality characteristic group using the quality indicators by which the primary weight is multiplied and multiplying and integrating each calculated score for each data quality characteristic group by a secondary weight being preset for each data quality characteristic group.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION

Figure 1:
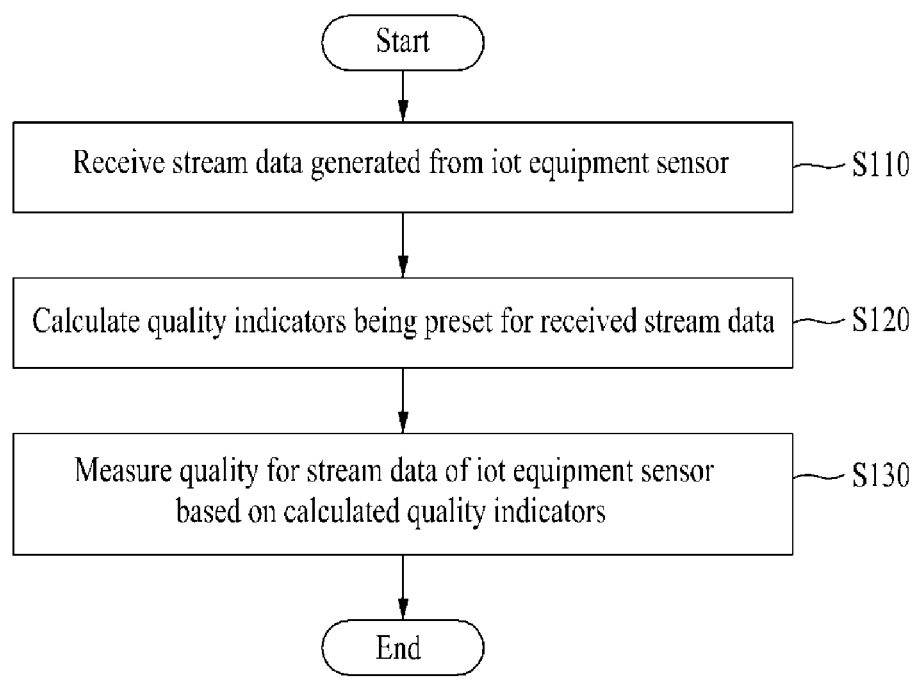
FIG. 1 is an operational flowchart illustrating a method for measuring IoT stream data quality according to an embodiment of the inventive concept.

Advantages, features, and methods of accomplishing the same will become apparent with reference to embodiments described in detail below together with the accompanying drawings. However, the inventive concept is not limited by embodiments disclosed hereinafter, and may be implemented in various forms. Rather, these embodiments are provided to so that this disclosure will be through and complete and will fully convey the concept of the invention to those skilled in the art, and the inventive concept will only be defined by the appended claims.

Terms used in the specification are used to describe embodiments of the inventive concept and are not intended to limit the scope of the inventive concept. In the specification, the terms of a singular form may include plural forms unless otherwise specified. The expressions "comprise" and/or "comprising" used herein indicate existence of one or more other components, steps, operations, and/or elements other than stated, components, steps, operations, and/or elements but do not exclude presence of additional elements.

Unless otherwise defined herein, all terms (including technical and scientific terms) used in the specification may have the same meaning that is generally understood by a person skilled in the art. Also, terms which are defined in a dictionary and commonly used should be interpreted as not in an idealized or overly formal detect unless expressly so defined.

Hereinafter, a description will be given in detail of exemplary embodiments of the inventive concept with reference to the accompanying drawings. Like reference numerals are used for the same components shown in each drawing, and a duplicated description of the same components will be omitted.

Embodiments of the inventive concept are the gist of defining quality indicators (or quality indexes) for measuring IoT stream data quality and measuring the IoT stream data quality using the defined quality indicators.

Herein, an embodiment of the inventive concept may measure IoT stream data quality by defining a single signal quality indicator (SSQI) being a quality indicator for single stream data and a multiple signals quality indicator (MSQI) being a quality indicator for a relationship between several stream datasets and calculating indicators included in the defined SSQI and indicators included in the MSQI.

In addition, in measuring the IoT stream data quality using the calculated indicators, an embodiment of the inventive concept may use a method for integrating the calculated indicators or a method for dividing the calculated indicators into groups for every prominent data quality characteristics, calculating scores for the data quality characteristics, and integrating the calculated scores.

An embodiment of the inventive concept will be described with reference to FIGS. 1 to 8.

Figure 2:
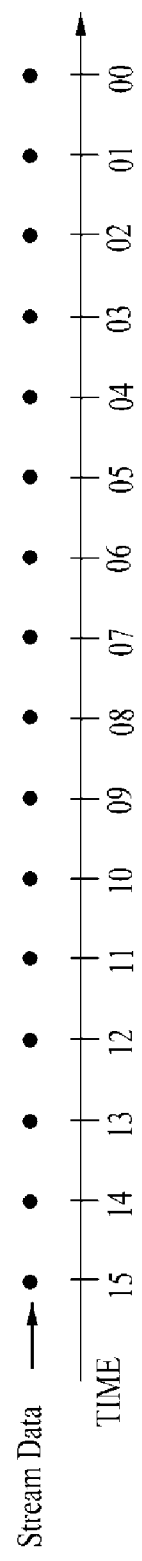
FIG. 2 is a drawing illustrating time-driven data.
Figure 3:
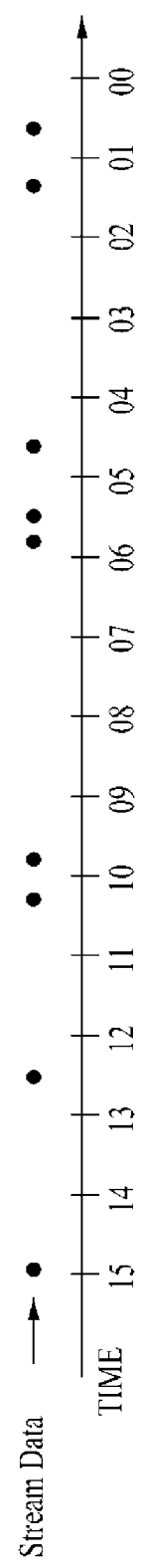
FIG. 3 is a drawing illustrating event-driven data.
Figure 4:
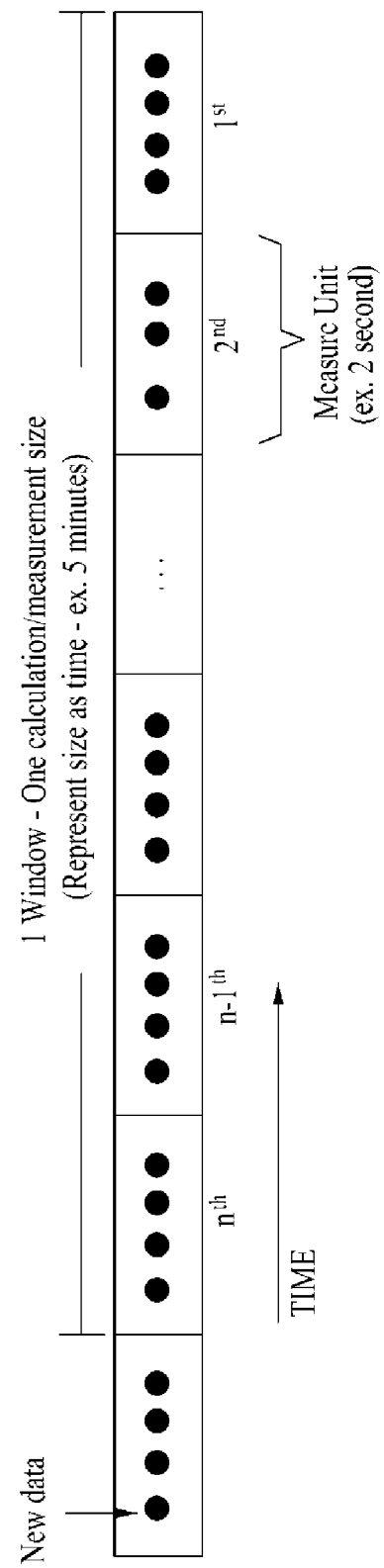
FIG. 4 is a drawing illustrating a window-driven operation.
Figure 5:
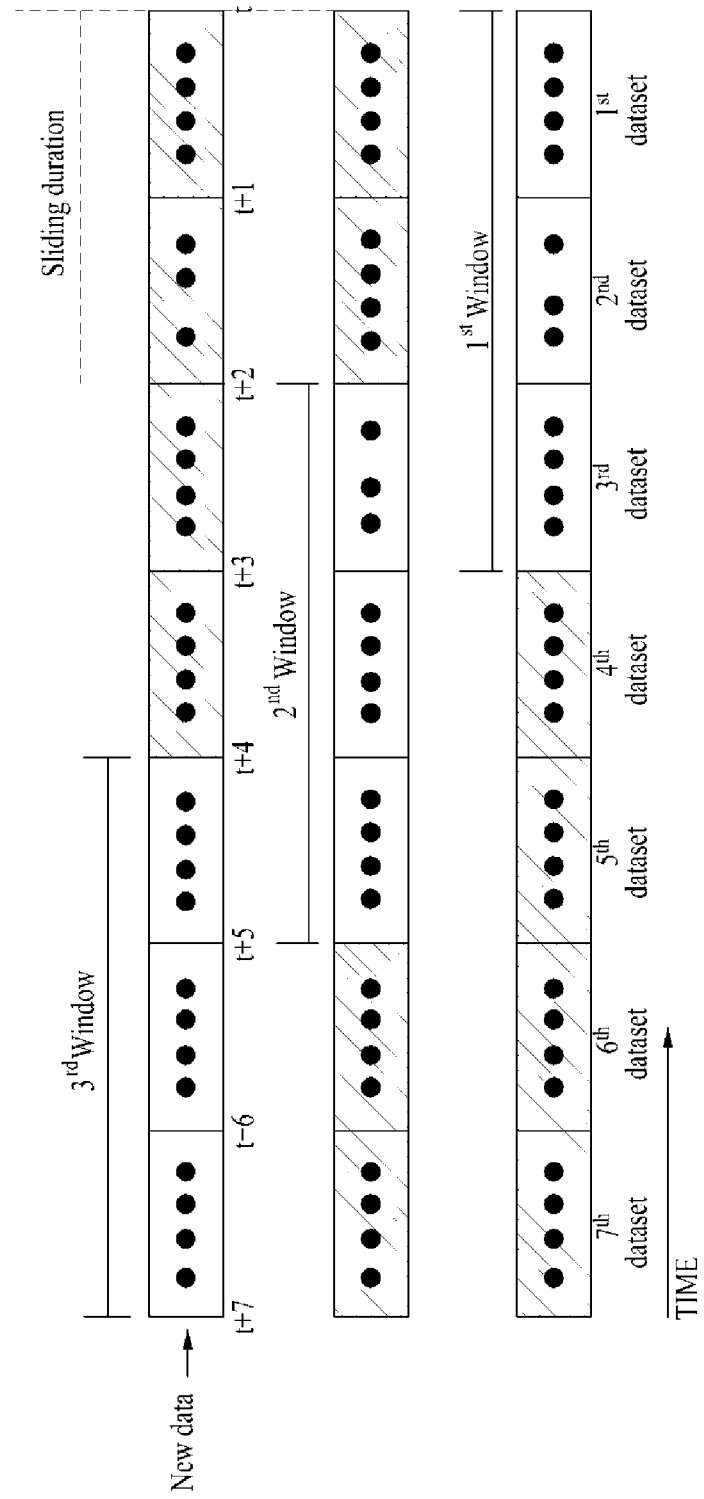
FIG. 5 is a drawing illustrating a sliding duration time.

FIG. 1 is an operational flowchart illustrating a method for measuring IoT stream data quality according to an embodiment of the inventive concept. FIG. 2 is a drawing illustrating time-driven data. FIG. 3 is a drawing illustrating event-driven data. FIG. 4 is a drawing illustrating a window-driven operation. FIG. 5 is a drawing illustrating a sliding duration time.

Referring to FIG. 1, in a method for measuring an IoT stream data quality according to an embodiment of the inventive concept, in operation S110, stream data generated from at least one or more IoT equipment sensors may be received.

When the stream data is received from the at least one or more IoT equipment sensors in operation S110, in operation S120, quality indicators being preset for the received stream data of the IoT equipment sensor, for example, quality indicators included in an SSQI which is a quality indicator for single stream data and quality indicators included in an MSQI which is a quality indicator for a relationship between several stream datasets, may be calculated.

Herein, the SSQI may include a uniform frequency indicator, an empty time indicator, a flat value indicator, a value period indicator, an event pattern indicator, an enough volume indicator, an out of range outlier indicator, a statistical outlier indicator, a data update indicator, a trend abnormal indicator, and a wrong timestamp indicator. The MSQI may include an interactive rule indicator, a value similarity indicator, a distribution similarity indicator, a pattern similarity indicator, a trend similarity indicator, and a time synchronicity indicator.

Of course, in an embodiment of the inventive concept, it is assumed that criteria capable of evaluating stream data quality on the basis of the SSQI and the MSQI is already defined in device or static metadata or observed or dynamic metadata.

When each of the quality indicators is calculated in operation S120, in operation S130, quality for the stream data of the IoT equipment sensor may be measured based on each of the calculated quality indicators.

Herein, operation S130 may be to measure the quality for the stream data of the IoT equipment sensor using several manners.

As an example, operation S130 may be to measure the quality for the stream data of the IoT equipment sensor by integrating each of the quality indicators calculated in operation S120. In this case, operation S130 may be to measure the quality for the stream data of the IoT equipment sensor by multiplying each of the calculated quality indicators by a weight being preset for each of quality indicators and integrating the quality indicators by which the weight is multiplied.

As another example, operation S130 may be to measure the quality for the stream data of the IoT equipment sensor by dividing the quality indicators calculated in operation S120 into groups for every predetermined prominent data quality characteristics, calculating each score for each data quality characteristic group, and integrating each calculated score for each data quality characteristic group. In this case, operation S130 may be to measure the quality for the stream data of the IoT equipment sensor by multiplying each of quality indicators included for each data quality characteristic group by a predetermined primary weight, calculating each score for each data quality characteristic group using the quality indicators by which the primary weight is multiplied, and integrating each calculated score for each data quality characteristic group. In addition, operation S130 may be to measure the quality for the stream data of the IoT equipment sensor by calculating each score for each data quality characteristic group using the quality indicators by which the primary weight is multiplied and multiplying and integrating each calculated score for each data quality characteristic group by a secondary weight being preset for each data quality characteristic group.

Such a method according to an embodiment of the inventive concept will be described in detail with reference to FIGS. 2 to 7.

In the method according to an embodiment of the inventive concept, describing basic information for measuring sensor data quality, data generated from an IoT equipment sensor may also be treated like a time index when the data is generated, and there may be a feature where the generated data is input to a means for measuring data quality steadily and continuously, for example, a quality measurement module. Furthermore, the quality measurement module may have meta information of a sensor or device. The quality measurement module may include a manufacturer name (or a manufacturer ID), a sensor name (or a sensor ID), and a sensor description, which are existing information, and may include a measurement data type (e.g., a wind speed, temperature, humidity, or the like), a measurement data unit (e.g., ° C., m/h, or the like), a stream data type (e.g., time-driven data or event-driven data), a quality standard value (e.g., a real number between 0 and 1 as criteria of whether quality of a sensor is good or not), a window size which is a size of data used for measuring data quality once, a measure unit size which is a size of data divided in subunits to analyze one window, or a sliding duration time which is a period when data quality is measured again, which are measurement information.

To measure stream data quality of an IoT equipment sensor, a stream data type, a window-driven operation, and a sliding duration time should be considered.

The stream data type occupies high importance for quality measurement. Herein, because a difference in a kind or analysis method of a quality indicator, setting a reference value, or the like occurs according to the defined stream data type, type management for collected stream data may be performed.

As shown in FIG. 2, time-driven data refers to data of a type where data is periodically collected over a specific time. In general, a signal (analog) generated from real equipment may fail to have periodicity such as when a sensor signal is continuous or when a data signal is generated when any event occurs, but such a signal should be generated as being discrete to process the signal as digital data. At this time, the 'time-driven data' may be generated by periodically processing data. Sometimes, all the generated signals are not made as data, and collected data when the data is collected at a certain short time period (e.g., 0.001 seconds, 0.1 seconds, 1 second, or the like) may be included in the time-driven data. Such time-driven data may be easy to set quality criteria for data collection.

As shown in FIG. 3, event-driven data may refer to data of a form where a signal generated by equipment is collected (made as data) when any specific event occurs or when a change in signal value occurs without being periodically collected (made as data). Such event-driven data is difficult to set quality criteria because data is generated until a specific condition is satisfied without a rule such as a data generation period.

As shown in FIG. 4, stream data generated by an IoT equipment sensor may always be generated in order of time. Because of that, when desiring to measure data quality, quality may be measured in units such as a quality measurement interval or a window. Such a data quality measurement interval may consist of a quality measure unit of a minimum unit, and calculation for quality may be performed per every measure unit time. The result of measuring one window data quality may be evaluated by adding a calculation result in each quality measure unit. A characteristic value of a dataset in short units should be extracted to quickly measure quality, and criteria may differ depending on the amount of data generation/collection. Stream data quality evaluation may be to evaluate quality for data of a certain time or more, and the result of evaluation may be too easily changed to evaluate sensor data quality using data in very short units. A quality evaluation result is not quickly changed like a change in data value. Sometimes, there is a need to detect a change in data quality of several or a lot of windows, and such a case may be registered and monitored as a business rule when necessary.

Furthermore, to measure stream data quality, as shown in FIG. 5, a period of a repeated window should be defined and managed as a sliding duration time. In this case, a sliding duration time value may be experientially assigned according to how to analyze the result of data quality. For example, as shown in FIG. 5, a sliding duration time value may be assigned as two time sizes (2t).

Data quality should be measured by periodically repeating data of a window size (seconds) due to the nature of stream data analysis, and basic profiling for window data may always be performed most basically. Herein, a data measurement process may be to fetch data of a window size per every sliding duration time and perform basic data profiling using the data. A data profiling method for every window data may be frequency count, distinct count, average, sum, min/max, recent time, trend, or the like.

Hereinafter, the SSQI and the MSQI will be described in detail.

The SSQI may be a data quality measurement indicator for a value for single stream data or collection accuracy, which may be to measure quality on the basis of a ground truth value (an equipment measurement range or the like) or a value obtained by observing the same stream data for a long time.

The uniform frequency indicator (SSQI-01) may be an indicator for identifying a degree to which data is collected per unit time and measuring a degree to which data is uniformly collected, which may be an indicator for evaluating whether data generated by a sensor is homogeneously generated (collected). When data is omitted or arrives late depending on a data transmission environment (e.g., a situation of a network, a load of collection equipment, or the like), but there is a situation where it is possible for a system which wants to use corresponding sensor data to trust and use the data when the data should be stably collected. In such a situation, data quality may be determined on the basis of uniformity of data generation (collection). Herein, data quality measurement criteria may be the number of data collected (generated) per measurement unit expected by a corresponding sensor, and a reference value may be an integer value of greater than 0. A data measurement process may be to fetch data of a window size per every sliding duration time, divide a corresponding window into a predetermined number of subintervals, each of which has the same size, obtain the number of data included in each subinterval, and calculate the uniform frequency indicator using the number of subunits where the obtained number of data in each subinterval is identical to a measurement reference number.

The empty time indicator (SSQI-02) may be an indicator for measuring a degree to which data is not collected per unit time, which may be an indicator for evaluating a degree to which a data generated by a sensor is not generated (collected) during a certain time. The SSQI-02 may be an indicator for measuring data satisfaction in the same situation as the SSQI-01, which may be different from the SSQI-01, that is, may be to measure a data interval where data is collected less than expected without a data interval where data is collected (generated) more than expected to measure whether a minimum of data is collected to use the data. In such a situation, data quality may be determined on the basis of stability of data generation (collection). Herein, data quality measurement criteria may be the expected number of data which should be minimally collected (generated) per measurement unit by a corresponding sensor, and a reference value may be an integer value of greater than 0. A data measurement process may be to fetch data of a window size per every sliding duration time, divide a corresponding window into a predetermined number of subintervals, each of which has the same size, obtain the number of data included in each subinterval, and calculate the empty time indicator using the number of subintervals where the obtained number of data in each subinterval is less than or equal to a measurement reference number.

The flat value indicator (SSQI-03) may be an indicator for measuring a degree of a change in data value during a certain time, which may be an indicator for detecting a phenomenon where there is no (small) value fluctuation during a certain time in data generated by a sensor. Although the sensor does not actually generate data depending on the sensor and an environment where sensor data is collected, a sensor data collector may recognize and process a last collected value as being continuously collected. In another case, because there is a too small difference between data generated by the sensor and data generated immediately before the data, it may not determine that the data is changed or an event occurs. In such a situation, data quality may be determined on the basis of confidence of a data value. Herein, data quality measurement criteria may be a range (an absolute value) of a minimum difference value where a value of the collected data should have a difference with a value of data collected immediately before the data. A data measurement process may be to calculate the flat value indicator by fetching data of a window size per every sliding duration time, arranging all data included in a window in order of time to obtain a difference value of data before and after the data, and identifying a difference value less than the data quality measurement criteria among all the difference values.

The value period indicator (SSQI-04) may be an indicator for measuring a phenomenon departing from a periodic pattern of data, which may be an indicator for measuring that a pattern of a value of data generated by a sensor has a pattern different than usual (departing from a normal category). When it is difficult to specify a change in sensor data value as a certain range or distribution, a past data value change pattern may be developed as a measurement model of learning a past pattern using a time series data analysis technique (e.g., autoregressive integrated moving average (ARIMA), long short-term memory (LSTM), or the like). It may be detected that a pattern of a currently generated sensor data value departs from a normal category using the measurement model. In such a situation, data quality may be determined on the basis of reliability of a data value. Herein, data quality measurement criteria may be a model to be used for measurement, metal information of the model, and a reliable interval capable of determining that a pattern of a collected data value is within the range of a normal pattern. A data measurement process may be to calculate the value period indicator by fetching data of a window size per every sliding duration time and detecting abnormal data, which departs from the reliable interval, using a previously learned quality measurement model.

The event pattern indicator (SSQI-05) may be an indicator for measuring a phenomenon departing from a periodic pattern of frequency where data is collected, which may be an indicator for measuring that a frequency pattern of data generated by a sensor has a pattern different than usual (departing from a normal category). Sensor data of an event type may be generated whenever a specific event occurs in the sensor. When it is difficult to specify a pattern of such an event as a certain range or distribution, a past data generation frequency pattern may be learned as a past pattern by using a volatility model using a time series data analysis technique (e.g., generalized autoregressive conditional heteroskedasticity (GARCH) or the like). It may be detected that a currently generated sensor data event (frequency)

pattern departs from a normal category using the past pattern. In such a situation, data quality may be determined on the basis of reliability of a data value. Herein, data quality measurement criteria may be a model to be used for measurement, metal information of the model, and a reliable interval capable of determining that a pattern of a collected data value is within the range of a normal pattern. A data measurement process may be to calculate the event pattern indicator by fetching data of a window size per every sliding duration time and extracting an abnormal volatility interval, which departs from the reliable interval, as a time size value using a quality measurement model previously learned using an event time of each data.

The enough volume indicator (SSQI-06) may be an indicator for measuring a degree to which data is collected enough during a certain time, which may be an indicator for measuring whether data generated by a sensor is generated enough to be used. When data generated (collected) during a specific period (a window period normally) is generated less than expected by an event-driven sensor, it may be determined that there is a problem in the sensor. When data collected from a server to be used is less than expected due to a problem of an environment around a time-driven sensor for the time-driven sensor, it may be determined that there is a problem in the sensor or the environment. In such a situation, data quality may be determined on the basis of sufficiency of data generation (collection). Herein, data quality measurement criteria may be the minimum number of times of frequency where collected data should be generated. A data measurement process may be to calculate the enough volume indicator by fetching data of a window size per every sliding duration time and verifying whether the number of window data is greater than or equal to the data quality measurement criteria.

The out of range outlier indicator (SSQI-007) may be an indicator for measuring a degree to which data departing from a normal value range (linear and nonlinear) analyzed through past data is detected, which may be an indicator for identifying a degree to which outlier data generated as sensor data departs from a range with upper/lower value is generated. Because a sensor suddenly generates outlier data very frequently. It desires to detect it. A reference range value based on past data before measurement may be generated, and outlier data may be detected on the basis of the reference range value. Because a reference range is able to be periodically and newly determined through an analysis model, a newly generated reference range may be updated to data quality check criteria to be applicable. This may determine data quality on the basis of reliability of a data value. Herein, data quality measurement criteria may be a maximum value of a normal range data measured by the sensor may have and a minimum value of the normal range the data measured by the sensor may have. A data measurement process may be to calculate the out of range outlier indicator by fetching data of a window size per every sliding duration time and measuring the number of data departing from a predetermined range among window data.

The statistical outlier indicator (SSQI-08) may be an indicator for measuring a degree of data departing from a value distribution range of data itself to be measured, which may be an indicator for, after it is assumed to be a distribution (e.g., a normal distribution) of data in one window, which is generated by a sensor, identifying a degree to which outlier data departing from a reliable interval of the distribution is generated. Because a sensor suddenly generates outlier data very frequently, it desires to detect it. It is good to detect outlier data generated within a nearby range because of using only data included in one window, and a model is not analyzed in advance because of always determining a distribution shape as data in a window. This may determine data quality on the basis of reliability of a data value. Herein, data quality measurement criteria may be a range (a reliable range) of normal data of a distribution data in a window has. A data measurement process may be to calculate the statistical outlier indicator by fetching data of a window size per every sliding duration time, after it is assumed to be a distribution of corresponding data using all window data, obtaining a mean and variance of the window data when the distribution is a normal distribution, and obtaining an upper limit and a lower limit of the reliable interval based on the mean and variance.

The data update indicator (SSQI-09) may be an indicator for measuring a degree to a temporal distance from recently measured data, which may be an indicator for identifying a phenomenon where data is not generated within an expected time when the data should be generated. When data is not generated once in the case where an event-driven sensor should generate (change) data more than at least once during a specific period, it may be determined that there is a problem in the sensor. In such a situation, data quality may be determined on the basis of currency of data generation (collection). Herein, data quality measurement criteria may be a period when data should be generated again after last data is generated. A data measurement process may be to measure data per every sliding duration time, fetch most recently generated data, calculate a difference between a time of the data and a current time, and calculate a difference after last data is generated as the data update indicator based on the data quality measurement criteria.

The trend abnormal indicator (SSQI-10) may be an indicator for measuring a phenomenon departing from a determined data flow trend, which may be an indicator for identifying a phenomenon when a trend of a value of data generated by a sensor is suddenly changed and measuring stability of the data. For data such as temperature of weather, a measurement value is not suddenly changed. In other words, a target which should be changed to an absolute change rate (a trend, a slope) or less may detect a situation where a trend is suddenly changed. In such a situation, data quality may be determined on the basis of stability of a data value. Herein, data quality measurement criteria may be whether to apply smoothing upon trend calculation, a smoothing method when applying smoothing, and a maximum change a trend of data in a window may have. A data measurement process may be to calculate the trend abnormal indicator by fetching data of a window size per every sliding duration time, performing a smoothing work of window data using moving average or the like if necessary, calculating a simple regression model equation using the smoothed window data, and calculating a trend of corresponding data using a coefficient of the calculated regression model.

The wrong timestamp indicator (SSQI-11) may be an indicator for measuring a degree to which incorrectly set time data of collected data is generated, which may be an indicator for identifying a phenomenon where a time of data generated by a sensor is incorrectly set or where data arriving late occurs. Time may be generated with an incorrect value (e.g., a different format, setting to a value rather than time, or the like) when mapping time to data measured by the sensor, and this may be unusable data. Furthermore, when data is early generated in the sensor or arrives later than other data due to a problem of a network, it is difficult to immediately use the data and it desires to measure a degree of such a phenomenon. This may determine data quality on the basis of stability of data generation (collection). Herein, data quality measurement criteria may be an allowable maximum time taken from the sensor to a data collector. A data measurement process may be to fetch data of a window size per every sliding duration time and calculate the wrong timestamp indicator based on a start time of every window and a time when each data is generated.

The MSQI may be an indicator for defining a relationship between several stream datasets and measuring quality of data using the relationship, which may be to measure quality mainly on the basis of business rules or pre-defined data rules of a predetermined data value between mutual data sets or related similarly bound rules between pre-defined similar datasets. To measure data quality for several sensors, quality measurement target sensors for each indicator, a window size for quality measurement (different from a window size set for each sensor used in the SSQI), a period to repeatedly measure quality, a synchronization time range for data comparison between sensors (e.g., when one second is determined as a synchronization time, data from 0.000 second to 0.999 seconds is included in the synchronization time range), or a method for calculating a representative value in the synchronization time range (e.g., a mean, a median, a standard deviation, a min/max, and a range (=max-min), that is, when data generated within the pre-defined synchronization range is greater than 1, the data may be calculated as a representative value of the synchronization time range using the method such as the mean, the median, the standard deviation, the min/max, or the range) may be separately determined.

The interactive rule indicator (MSQI-01) may be an indicator for measuring a degree departing from a predetermined normal rule between specified datasets, which may be an indicator for identifying how many data collected from target sensors conforms to a rule to be measured. Several sensors may be operated at the same time in one equipment, there may be clear rules between such sensors, and it may be determined that a problem occurs in a corresponding sensor or a corresponding situation when there occurs a situation where important rules which should be observed among the clear rules are violated. A corresponding rule may be written in various forms, but, because the corresponding rule is able to be represented as rule notation, such as structured query language (SQL) or business process model and notation (BPMN), and has quality measurement criteria therein, it may compare interactive sensor data based on a rule to calculate a list of data, determined as being abnormal as compared with the quality criteria, as a result. In such a situation, data quality may be determined on the basis of compliance of a data value (a sensor operation). Herein, data quality measurement criteria may be a comparable rule (quality rule) between sensors. A data measurement process may be to calculate the interactive rule indicator by fetching data of a window size per every sliding duration time, calculating data collected for each sensor as representative data at intervals of a synchronization time range, and applying and calculating the representative value of the synchronization time range calculated for each sensor to the quality rule.

The value similarity indicator (MSQI-02) may be an indicator for measuring a degree departing from an allowable error allowed between datasets where the same contents are collected, which may be an indicator for identifying whether data values collected from target sensors are stably collected as values within a similar range. Some equipment may operate a plurality of sensors when measuring one measurement (sensing) target to collect a sensor data value with high reliability, and it may be assumed that sensors in the geographical neighborhood generally measure similar values. In other words, it may be determined that a problem occurs in a specific sensor when a situation departing from an expected similar range occurs among the sensors in the neighborhood. In such a situation, data quality may be determined on the basis of accuracy of a data value (a sensor operation). Herein, data quality measurement criteria may be a reliable interval where it may be determined that a difference between representative values of each synchronization time range of all measurement target sensors is within a normal range. A data measurement process may be to calculate the value similarity indicator by fetching data of a window size per every sliding duration time from target sensors, calculating data collected for each sensor as representative data at intervals of a synchronization time range, calculating a difference between the largest value and the smallest value among representative values of a synchronization time range of target sensors included in each synchronization time range, and comparing whether the calculated difference is within a reliable interval range.

The distribution similarity indicator (MSQI-03) may be an indicator for measuring a degree of similarity where a specified dataset shows a similar distribution over time, which may be an indicator for identifying whether changes/distributions in data values collected from target sensors are similar to each other. Several types of sensors may be operated at the same time in one equipment, and one measurement (sensing) target may vary when such sensors measure the same equipment. However, it may be assumed that measurement value distribution shapes of the sensors which measure the same equipment have the same pattern. Thus, it may be determined that a problem occurs in a target of a specific sensor or a corresponding situation when the situation departing from an expected similar distribution range occurs among target sensors. For example, an 'air speed sensor' and an 'air pump vibration sensor' among several sensors which measures one air pump equipment may have the same pattern (data distribution shape). It may be seen that, when a speed of air flowing into the pump is fast, vibration is increased. It may be seen that, when the speed of air is slow, vibration is reduced. When mutual data patterns become very different in shape for various reasons, it may be determined that an abnormal situation occurs. In such a situation, data quality may be determined on the basis of consistency of a data value (a sensor operation). Herein, data quality measurement criteria may include an algorithm (e.g., Euclidean distance, dynamic time warping (DTW), or the like) capable of comparing time series data distribution patterns/shapes of target sensors and a similar distribution allowable range of a distribution data of the target sensors has. A data measurement process may be to calculate the distribution similarity indicator by fetching data of a window size per every sliding duration time from target sensors, calculating data collected for each sensor as representative data at intervals of a synchronization time range, and comparing how many degree to which a similar distance is longest departs from a similar distribution allowable range.

The pattern similarity indicator (MSQI-004) may be an indicator for measuring a degree to which a data generation pattern is varied between specified datasets, which may be an indicator for identifying whether data generation patterns (periods) of measurement target sensors are similar to each other. Several sensors may measure one equipment at the same time, and an event-driven sensor may generate (sense) data only when there is a specific change. In this case, it may be assumed that data generated between sensors having similar purposes have the same pattern. Thus, it may be determined that a problem occurs in a target of a specific sensor or a corresponding situation when the situation departing from an expected data generation pattern (period) occurs among target sensors. In such a situation, data quality may be determined on the basis of consistency of data generation (collection). Herein, data quality measurement criteria may include an algorithm (e.g., Euclidean distance, dynamic time warping (DTW), or the like) capable of comparing time series data distribution patterns/shapes of target sensors and a similar allowable range of a pattern generation frequency data of the target sensors has. A data measurement process may be to calculate the pattern similarity indicator by fetching data of a window size per every sliding duration time from target sensors, calculating the number of data, in which data collected for each sensor is collected at intervals of a synchronization time range, as a representative value, calculating a similar distance degree between the target sensors, and comparing how many degree to which a similar distance is longest departs from the similar allowable range.

The trend similarity indicator (MSQI-05) may be an indicator for measuring a degree to which a data flow trend between specified datasets is varied, which may be an indicator for identifying whether data value trends of measurement target sensors are similar to each other. Several sensors may be operated at the same time in one equipment, and the respective sensors may collect data having a similar trend depending on a situation of the equipment. In this case, it may be determined that a problem occurs in a target of a specific sensor which does not have a similar trend pattern among sensors expected to be similar in trend or in a corresponding situation. When it is difficult to compare data value patterns in detail between sensors like the MSQI-03, the MSQI-05 may be to monitor a situation where target sensors operate similarly using an overall moving trend. In such a situation, data quality may be determined on the basis of consistency of a data value (a sensor operation). Herein, data quality measurement criteria may be whether to apply smoothing upon trend calculation, a smoothing method when applying smoothing, and a similar allowable range of a trend difference of sensors. A data measurement process may be to calculate the trend similarity indicator by fetching data of a window size per every sliding duration time from target sensors, calculating data collected for each sensor as representative data at intervals of a synchronization time range, performing smoothing using moving average or the like when applying a representative value of the calculated synchronization time range of the target sensors to smoothing, calculating a simple regression model equation using the smoothed data, calculating a trend of corresponding data using a slope coefficient of the calculated regression model, and calculating a comparison between the calculated largest data trend between the target sensors and the similar allowable range.

The time synchronicity indicator (MSQI-06) may be an indicator for measuring a degree of a time difference collected/processed between datasets measured at the same time, and which may be an indicator for identifying how accurate a data generation pattern (period) of measurement target sensors is. Several sensors may measure one equipment at the same time, and an event-driven sensor may generate (sense) data only when there is a specific change. In this case, it may be assumed that data generation (sensing) between sensors having similar purposes occurs at the same time. Thus, it may be determined that a problem occurs in a corresponding sensor or situation when data generation (sensing) is not performed at the same time among target sensors. In such a situation, data quality may be determined on the basis of time synchronicity of data generation. Herein, data quality measurement criteria may be an identical allowance number. A data measurement process may be to calculate the time synchronicity indicator by fetching a data of a window size per every sliding duration time from target sensors, checking whether there is data in which data collected for each sensor is collected at intervals of a synchronization time range, and comparing a result of whether there is data collected for every synchronization range with an identical allowance number.

As described above, an embodiment of the inventive concept may calculate quality indicators including the 11 SSQIs and the 6 MSQIs and may measure quality for stream data generated from at least one or more IoT equipment sensors using the calculated quality indicators.

In this case, an embodiment of the inventive concept may integrate various quality indicators of the sensor into one to represent data quality as one value, thus measuring quality for stream data generated from an IoT equipment sensor and measuring quality using a method for integrating a stream data quality indicator (SDQI) and a method for calculating and integrating an IoT data quality characteristic score.

Such methods will be described with reference to FIGS. 6 and 7.

Figure 6:
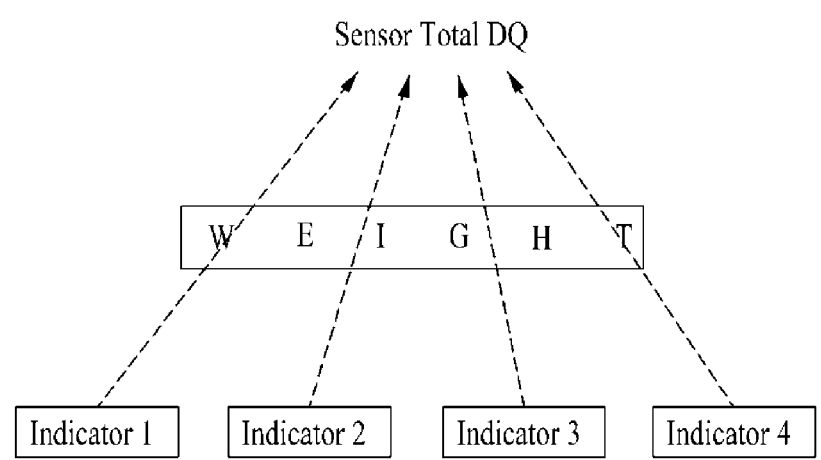
FIG. 6 is a drawing illustrating a method of an embodiment for measuring an integrated data quality level of a sensor.

FIG. 6 is a drawing illustrating a method of an embodiment for measuring an integrated data quality level of a sensor. FIG. 6 is a drawing illustrating a method for integrating stream data quality indicators.

As shown in FIG. 6, a method for measuring integrated data quality of a sensor according to an embodiment may be a method for representing the integrated data quality of the sensor by using various measured stream data quality indicators without change, which may be to measure quality of the sensor by integrating selected SDQIs (indicators 1 to 4) when a quality manager selects the SDQIs to be measured according to a data characteristic of each sensor. In this case, an embodiment of the inventive concept may assign weights being preset according to importance to the selected SDQIs, thus integrating SDQI quality indicators by which the weights are multiplied, for example, calculating weight 1\*indicator 1+weight 2\*indicator 2+weight 3\*indicator 3+weight 4\*indicator 4, and representing the value as a total quality level for stream data of the sensor. Herein, the sum of weights, that is, weight 1+weight 2+weight 3+weight 4 in FIG. 6, may be 1. In other words, in FIG. 6, the weighting sum using the weights may be defined as the integrated data quality level of the sensor. The integrated quality level of the sensor may be calculated by fetching an index value calculated for predetermined quality indicators per every sliding duration time and adding a value obtained by multiplying an index value by a predetermined weight to each of the quality indicators.

Figure 7:
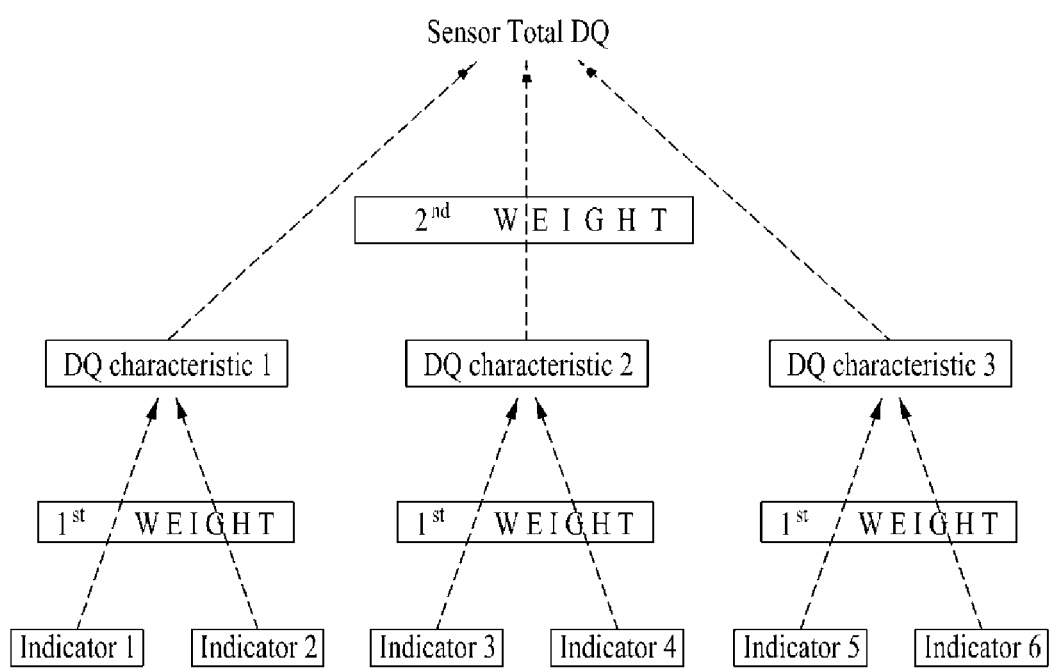
FIG. 7 is a drawing illustrating a method of another embodiment for measuring an integrated data quality level of a sensor.

FIG. 7 is a drawing illustrating a method of another embodiment for measuring an integrated data quality level of a sensor. FIG. 7 is a drawing illustrating a method for calculating and integrating IoT data quality characteristic scores.

As shown in FIG. 7, a method for calculating integrated data quality of a sensor according to another embodiment may be a method for dividing various measured stream data quality indicators for every similar data quality characteristics, calculating scores for the data quality characteristics, and integrating the scores, which may be to mapped to 'data quality characteristics' of selected SDQIs (it is possible to map one SDQI to a plurality of 'data quality characteristics'), when a data quality manager selects the SDQIs (indicators 1 to 6) to be measured according to a data characteristic of each sensor, assign a primary weight for each SDQI being preset according to importance to SDQIs included (mapped) in the same data quality characteristic (DQ characteristics 1 to 3), map 'data quality characteristics' depending on quality management (business) purposes for sensor data to assign a secondary weight being preset according to importance to 'data quality characteristics' selected (mapped) as data quality characteristics of the sensor, thus integrating the quality indicators to which the primary weight and the second weight are assigned and representing a quality level for stream data of the sensor. Herein, the sum of the primary weights for calculating each data quality characteristic may be 1, and the sum of the secondary weight values may also be 1. In this case, the SDQI weighting sum using the primary weights may be defined as a corresponding 'data quality characteristic' score, and the weighting sum of the 'data quality characteristic' scores using the secondary weights may be defined as a quality level of the sensor.

In other words, in FIG. 7, a quality level for stream data of an IoT equipment sensor may be represented by fetching an index value calculated for predetermined quality indicators per every sliding duration time, dividing the quality indicators into groups for every predetermined prominent data quality characteristics, multiplying an index value of each of quality indicators included for each data quality characteristic group by a predetermined primary weight to calculate a score for each group, and multiplying and integrating the calculated score for each group by a secondary weight being preset for each group.

As such, the method according to embodiments of the inventive concept may be to define quality indicators, that is, an SSQI and an MSQI, for measuring IoT stream data quality and calculate each of the defined quality indicators using stream data generated from an IoT equipment sensor, thus measuring the IoT stream data quality in real time.

Figure 8:
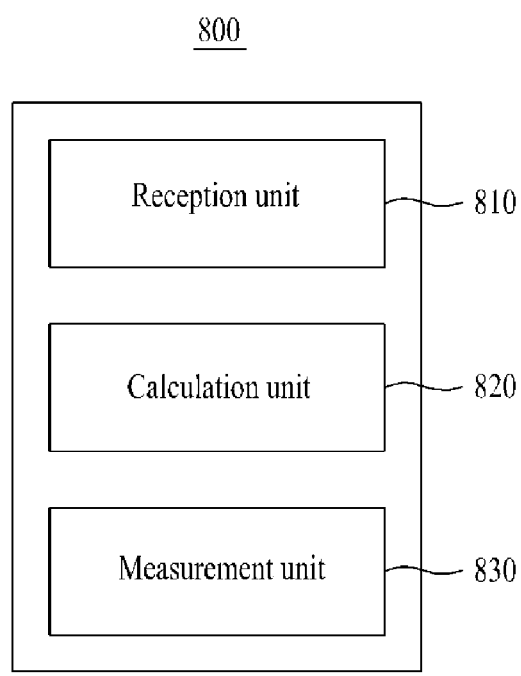
FIG. 8 is a block diagram illustrating a configuration of a system for measuring IoT stream data quality according to an embodiment of the inventive concept.

FIG. 8 is a block diagram illustrating a configuration of a system for measuring IoT stream data quality according to an embodiment of the inventive concept. FIG. 8 illustrates a conceptual configuration of a system for performing the method of FIGS. 1 to 7.

Referring to FIG. 8, a system 800 according to an embodiment of the inventive concept may include a reception unit 810, a calculation unit 820, and a measurement unit 830.

The reception unit 810 may receive stream data generated from at least one or more IoT equipment sensor.

The calculation unit 820 may calculate quality indicators being preset for the stream data of the IoT equipment sensor, which is received by the reception unit 810, for example, quality indicators included in an SSQI being a quality indicator for single stream data and quality indicators included in an MSQI being a quality indicator for a relationship between several stream datasets.

Herein, the SSQI may include a uniform frequency indicator, an empty time indicator, a flat value indicator, a value period indicator, an event pattern indicator, an enough volume indicator, an out of range outlier indicator, a statistical outlier indicator, a data update indicator, a trend abnormal indicator, and a wrong timestamp indicator. The MSQI may include an interactive rule indicator, a value similarity indicator, a distribution similarity indicator, a pattern similarity indicator, a trend similarity indicator, and a time synchronicity indicator.

The measurement unit 830 may measure quality for the stream data of the IoT equipment sensor based on each of the quality indicators calculated by the calculation unit 820.

Herein, the measurement unit 830 may integrate each of the quality indicators calculated by the calculation unit 820 to represent a quality level for the stream data of the IoT equipment sensor. In this case, the measurement unit 830 may multiply each of the quality indicators calculated by the calculation unit 820 by a weight being preset to each of quality indicators and may integrate the quality indicators by which the weight is multiplied, thus representing the quality level for the stream data of the IoT equipment sensor.

Herein, the measurement unit 830 may divide the quality indicators calculated by the calculation unit 820 into groups for every predetermined prominent data quality characteristics, may calculate each score for each data quality characteristic group, and may integrate each calculated score for each data quality characteristic group, thus representing the quality level for the stream data of the IoT equipment sensor. In this case, the measurement unit 830 may multiply each of quality indicators included for each data quality characteristic group by a predetermined primary weight, may calculate each score for each data quality characteristic group using the quality indicators by which the primary weight is multiplied, and may integrate each calculated score for each data quality characteristic group, thus representing the quality level for the stream data of the IoT equipment sensor. In addition, the measurement unit 830 may calculate each score for each data quality characteristic group using the quality indicators by which the primary weight is multiplied and may multiply and integrate each calculated score for each data quality characteristic group by a secondary weight being preset for each data quality characteristic group, thus representing the quality level for the stream data of the IoT equipment sensor.

It is apparent to those skilled in the art that, although the description is omitted in the system of FIG. 8, the respective components configuring FIG. 8 may include all details described in FIGS. 1 to 7.

The foregoing systems and devices may be realized by hardware elements, software elements and/or combinations thereof. For example, the systems, devices, and components illustrated in the exemplary embodiments of the inventive concept may be implemented in one or more general-use computers or special-purpose computers, such as a processor, a controller, an arithmetic logic unit (ALU), a digital signal processor, a microcomputer, a field programmable array (FPA), a programmable logic unit (PLU), a microprocessor or any device which may execute instructions and respond. A processing unit may implement an operating system (OS) or one or software applications running on the OS. Further, the processing unit may access, store, manipulate, process and generate data in response to execution of software. It will be understood by those skilled in the art that although a single processing unit may be illustrated for convenience of understanding, the processing unit may include a plurality of processing elements and/or a plurality of types of processing elements. For example, the processing unit may include a plurality of processors or one processor and one controller. Also, the processing unit may have a different processing configuration, such as a parallel processor.

Software may include computer programs, codes, instructions or one or more combinations thereof and may configure a processing unit to operate in a desired manner or may independently or collectively control the processing unit. Software and/or data may be permanently or temporarily embodied in any type of machine, components, physical equipment, virtual equipment, computer storage media or units or transmitted signal waves so as to be interpreted by the processing unit or to provide instructions or data to the processing unit. Software may be dispersed throughout computer systems connected via networks and may be stored or executed in a dispersion manner. Software and data may be recorded in one or more computer-readable storage media.

The methods according to the above-described exemplary embodiments of the inventive concept may be implemented with program instructions which may be executed through various computer means and may be recorded in computer-readable media. The media may also include, alone or in combination with the program instructions, data files, data structures, and the like. The program instructions recorded in the media may be designed and configured specially for the exemplary embodiments of the inventive concept or be known and available to those skilled in computer software. Computer-readable media include magnetic media such as hard disks, floppy disks, and magnetic tape; optical media such as compact disc-read only memory (CD-ROM) disks and digital versatile discs (DVDs); magneto-optical media such as floptical disks; and hardware devices that are specially configured to store and perform program instructions, such as read-only memory (ROM), random access memory (RAM), flash memory, and the like. Program instructions include both machine codes, such as produced by a compiler, and higher level codes that may be executed by the computer using an interpreter.

According to embodiments of the inventive concept, the system may define quality indicators for measuring IoT stream data quality and may measure the IoT stream data quality in real time using the defined quality indicators.

While a few exemplary embodiments have been shown and described with reference to the accompanying drawings, it will be apparent to those skilled in the art that various modifications and variations can be made from the foregoing descriptions. For example, adequate effects may be achieved even if the foregoing processes and methods are carried out in different order than described above, and/or the aforementioned elements, such as systems, structures, devices, or circuits, are combined or coupled in different forms and modes than as described above or be substituted or switched with other components or equivalents.

Therefore, other implements, other embodiments, and equivalents to claims are within the scope of the following claims.

What is claimed is:

1. A method for measuring internet of things (IoT) stream data quality, the method comprising:
    receiving stream data generated from at least one or more IoT equipment sensors;
    calculating quality indicators being preset for the received stream data; and
    measuring quality for the stream data of the IoT equipment sensor based on the calculated quality indicators;
    wherein the quality indicators include a single signal quality indicator (SSQI) being a quality indicator for single stream data and a multiple signals quality indicator (MSQI) being a quality indicator for a relationship between several stream datasets;
    wherein the SSQI includes a uniform frequency indicator, an empty time indicator, a flat value indicator, a value period indicator, an event pattern indicator, an enough volume indicator, an out of range outlier indicator, a statistical outlier indicator, a data update indicator, a trend abnormal indicator, and a wrong timestamp indicator, and
    wherein the MSQI includes an interactive rule indicator, a value similarity indicator, a distribution similarity indicator, a pattern similarity indicator, a trend similarity indicator, and a time synchronicity indicator.

2. The method of claim 1, wherein the measuring of the quality includes:
    measuring the quality for the stream data of the IoT equipment sensor by integrating each of the calculated quality indicators.

3. The method of claim 2, wherein the measuring of the quality includes:
    measuring the quality for the stream data of the IoT equipment sensor by multiplying each of the calculated quality indicators by a weight being preset for each of the quality indicators and integrating the quality indicators by which the weight is multiplied.

4. The method of claim 1, wherein the measuring of the quality includes:
    measuring the quality for the stream data of the IoT equipment sensor by dividing the calculated quality indicators into groups for every data quality characteristics, calculating each score for each data quality characteristic group, and integrating each calculated score for each data quality characteristic group.

5. The method of claim 4, wherein the measuring of the quality includes:
    measuring the quality for the stream data of the IoT equipment sensor by multiplying each of quality indicators included for each data quality characteristic group by a predetermined primary weight, calculating each score for each data quality characteristic group using the quality indicators by which the primary weight is multiplied, and integrating each calculated score for each data quality characteristic group.

6. The method of claim 5, wherein the measuring of the quality includes:
    measuring the quality for the stream data of the IoT equipment sensor by calculating each score for each data quality characteristic group using the quality indicators by which the primary weight is multiplied and multiplying and integrating each calculated score for each data quality characteristic group by a secondary weight being preset for each data quality characteristic group.

7. A system for measuring IoT stream data quality, the system comprising:
    a reception unit configured to receive stream data generated from at least one or more IoT equipment sensors;
    a calculation unit configured to calculate quality indicators being preset for the received stream data; and
    a measurement unit configured to measure quality for the stream data of the IoT equipment sensor based on the calculated quality indicators;
    wherein the quality indicators include a single signal quality indicator (SSQI) being a quality indicator for single stream data and a multiple signals quality indicator (MSQI) being a quality indicator for a relationship between several stream datasets;
    wherein the SSQI includes a uniform frequency indicator, an empty time indicator, a flat value indicator, a value period indicator, an event pattern indicator, an enough volume indicator, an out of range outlier indicator, a statistical outlier indicator, a data update indicator, a trend abnormal indicator, and a wrong timestamp indicator, and wherein the MSQI includes an interactive rule indicator, a value similarity indicator, a distribution similarity indicator, a pattern similarity indicator, a trend similarity indicator, and a time synchronicity indicator.

8. The system of claim 7, wherein the measurement unit measures the quality for the stream data of the IoT equipment sensor by integrating each of the calculated quality indicators.

9. The system of claim 8, wherein the measurement unit measures the quality for the stream data of the IoT equipment sensor by multiplying each of the calculated quality indicators by a weight being preset for each of the quality indicators and integrating the quality indicators by which the weight is multiplied.

10. The system of claim 7, wherein the measurement unit measures the quality for the stream data of the IoT equipment sensor by dividing the calculated quality indicators into groups for every data quality characteristics, calculating each score for each data quality characteristic group, and integrating each calculated score for each data quality characteristic group.

11. The system of claim 10, wherein the measurement unit measures the quality for the stream data of the IoT equipment sensor by multiplying each of quality indicators included for each data quality characteristic group by a predetermined primary weight, calculating each score for each data quality characteristic group using the quality indicators by which the primary weight is multiplied, and integrating each calculated score for each data quality characteristic group.

12. The system of claim 11, wherein the measurement unit measures the quality for the stream data of the IoT equipment sensor by calculating each score for each data quality characteristic group using the quality indicators by which the primary weight is multiplied and multiplying and integrating each calculated score for each data quality characteristic group by a secondary weight being preset for each data quality characteristic group.

* * * * *